United States Patent
Lee

(10) Patent No.: US 7,113,465 B2
(45) Date of Patent: Sep. 26, 2006

(54) METHOD OF AND APPARATUS FOR DETECTING TYPE OF DISC

(75) Inventor: Heuk-jin Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 534 days.

(21) Appl. No.: 10/720,204

(22) Filed: Nov. 25, 2003

(65) Prior Publication Data

US 2004/0120237 A1 Jun. 24, 2004

(30) Foreign Application Priority Data

Nov. 26, 2002 (KR) .................. 10-2002-0074112

(51) Int. Cl.
*G11B 27/36* (2006.01)
(52) U.S. Cl. ............................ 369/53.2; 720/616
(58) Field of Classification Search .............. None
See application file for complete search history.

(56) References Cited

U.S. PATENT DOCUMENTS

| 5,164,934 A | * | 11/1992 | Kase et al. ............... 720/606 |
|---|---|---|---|
| 5,235,581 A | * | 8/1993 | Miyagawa et al. ...... 369/44.12 |
| 6,035,395 A | * | 3/2000 | Saito ............................ 713/1 |
| 6,345,032 B1 | | 2/2002 | Kikuchi |
| 6,538,971 B1 | | 3/2003 | Seo et al. |
| 2004/0066712 A1 | * | 4/2004 | Mitsumoto et al. ...... 369/30.36 |
| 2004/0246848 A1 | * | 12/2004 | Ezawa et al. .............. 369/53.2 |
| 2005/0204373 A1 | * | 9/2005 | Ueno et al. ................. 720/616 |

FOREIGN PATENT DOCUMENTS

KR 1994-7827 4/1994
KR 1998-17217 5/1998

* cited by examiner

*Primary Examiner*—Thang V. Tran
*Assistant Examiner*—Parul Gupta
(74) *Attorney, Agent, or Firm*—Staas & Halsey LLP

(57) ABSTRACT

A method and apparatus for detecting a type of a disc in a disc drive system includes measuring an elapsed time between when a disc tray is in an open state and when it completely closes, comparing the elapsed time with a predetermined reference value, and determining whether the disc is a cartridge-type or a general-type based on the comparison result.

18 Claims, 5 Drawing Sheets

METHOD OF AND APPARATUS FOR DETECTING TYPE OF DISC

CROSS-REFERENCE TO RELATED APPLICATION

This application claims the benefit of Korean Patent Application No. 2002-74112, filed on Nov. 26, 2002 in the Korean Intellectual Property Office, the disclosure of which is incorporated herein by reference.

BACKGROUND OF THE INVENTION

1. Field of the Invention

The present invention relates to detecting a type of a disc, and, more particularly, to a method of and apparatus for detecting whether a cartridge-type disc is loaded in a disc drive by using a closing time of a disc tray of the disc drive.

2. Description of the Related Art

A cartridge-type disc, constructed with a disc and a cartridge surrounding the disc, has been developed to protect the disc from scratches or dust particles. FIG. 1A shows an appearance of the cartridge-type disc. The cartridge-type disc includes sensor holes H1, H2, and H3 for distinguishing the cartridge-type disc from a general-type disc when loaded in a disc drive and for indicating various conditions of the cartridge-type disc. FIG. 1B shows a schematic structure of the disc drive. The disc drive comprises a disc tray (not shown) for holding a disc, a spindle motor 100 for moving the disc tray, detection switches SW1, SW2, SW3, and SW4 for obtaining information about various conditions of the cartridge-type disc.

When the cartridge-type disc of FIG. 1A is inserted into the disc drive of FIG. 1B, the sensor holes H1, H2, and H3 come in contact with the detection switches SW1, SW2, and SW3, respectively, in the disc drive. The sensor holes indicate various states of the disc, such as whether the cartridge-type disc is writable, whether the cartridge-type disc is single-sided or double-sided, or whether the cartridge is unsealed such that the disc has been removed. In the disc drive of FIG. 1B, information about the state of a cartridge-type disc can be obtained via the detection of switches SW1, SW2 and SW3 being selectively in contact with the sensor holes H1, H2, and H3, respectively.

An additional detection switch SW4, for distinguishing whether the cartridge-type disc is loaded in the disc drive, is also included in the disc drive. When it is detected via the switch SW4 that the cartridge-type disc is loaded in the disc drive, information on the loading condition is transferred to a controller (not shown) in the disc drive. Then, the controller receives the information from the other switches (i.e., SW1, SW2, and SW3) to detect the state of the cartridge-type disc. The state of the cartridge-type disc is interpreted by the controller according to signals corresponding to the ON-state or OFF-state of the switches SW1, SW2, SW3, and SW4.

Accordingly, if the detection switch SW4 malfunctions, operations for obtaining information about the state of the cartridge-type disc via the switches SW1, SW2, and SW3 may not be performed. In practice, mechanical wear due to frequent pressure applied on the switch SW4 whenever the cartridge-type disc of FIG. 1B is inserted into or removed from the disc tray may cause the disc drive to malfunctions. For example, the switch SW4 may not be released from a pressed state, or vice versa. Since the disc detection is performed when the cartridge-type disc is loaded in the disc tray, the fault of the switch will inevitably occur in time. When this happens, a user has to perform a difficult and time-consuming operation to replace the switch with a new one.

SUMMARY OF THE INVENTION

Accordingly, it is an aspect of the present invention to provide a method and apparatus for detecting a type of a disc in a disc drive, by calculating a closing time of a disc tray without using a mechanical switch, thereby providing reliability in detecting the type of the disc.

Additional aspects and/or advantages of the invention will be set forth in part in the description which follows and, in part, will be obvious from the description, or may be learned by practice of the invention.

According to an aspect of the present invention, a method of detecting a type of a disc loaded in a disc drive includes measuring an elapsed time in which a disc tray closes completely from an open state, comparing the elapsed time with a predetermined reference value, and determining whether the disc is a cartridge-type or a general-type based on the result.

It is another aspect of the present invention to provide an apparatus for detecting a type of a disc loaded in a disc drive, the apparatus comprising a closing button which is pressed by a user to output a signal indicating that a disc tray is closing, a load-end switch to be turned on when the disc tray is completely closed, a counter which counts an elapsed time between when the closing button is pressed by the user until the load-end switch is turned on, a controller which instructs the disc tray to close when receiving the signal indicating that the disc tray is closing and instructs the counter to start counting, instructs the counter to stop counting when the load-end switch is turned on, obtains a resulting count value, and determines that the disc is a cartridge-type disc if the resulting count value is greater than a predetermined reference value.

It is another aspect of the present invention to provide a method of detecting a type of a disc loaded in a disc drive, the method comprising, recording a start time when a disc tray supporting the disc starts closing from an open state, recording a stop time when the disc tray is completely closed, comparing a resulting count value with a predetermined reference value, determining that the disc is a cartridge-type disc when the resulting count value is greater than the predetermined reference value, detecting whether sensor holes formed on the cartridge-type disc are open or closed, and recognizing the state of the disc based on the detection result of the sensor holes.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE EMBODIMENTS

Figure 1A:
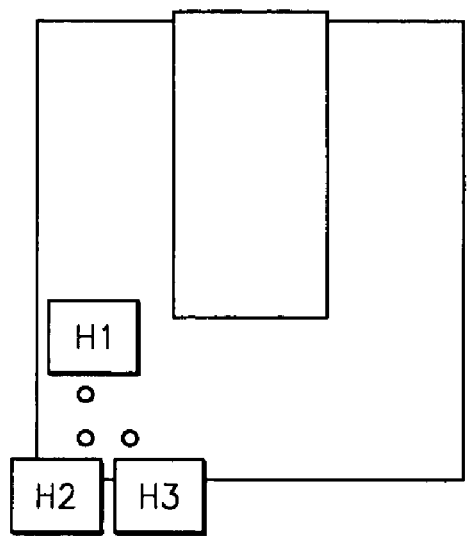
FIG. 1A shows an appearance of a conventional cartridge-type disc.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
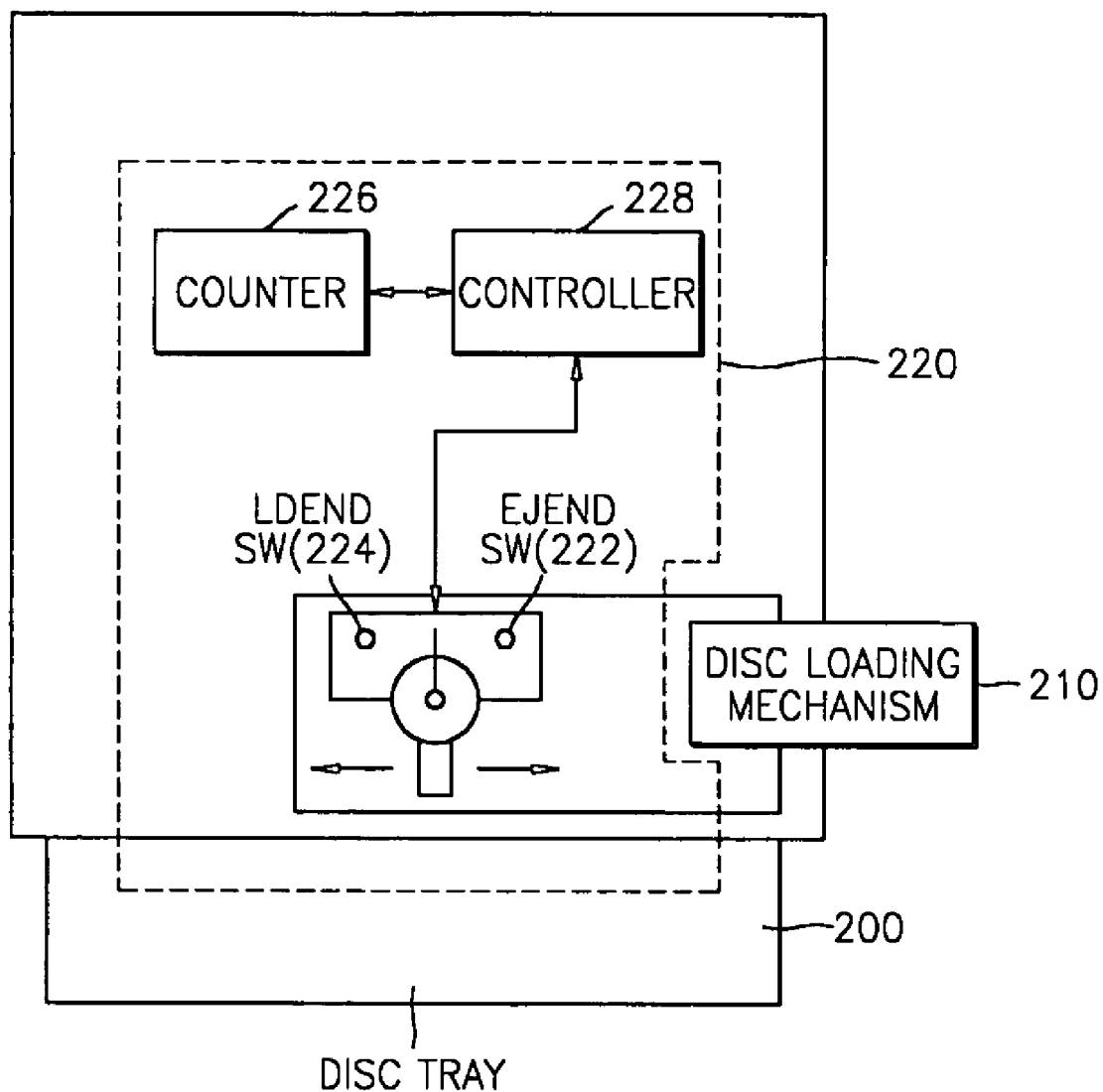
FIG. 2 is a schematic diagram of a disc drive including detection circuits according to an aspect of the present invention.

FIG. 2 is a schematic diagram of a disc drive including a cartridge-type disc detection apparatus according to an aspect of the present invention. In FIG. 2, the disc drive comprises a disc tray 200, a disc loading mechanism 210, and a disc detection and reproduction unit 220. The disc tray 200 may accommodate a general-type disc having no protection case (i.e. a bare disc) or a cartridge-type disc, which is a disc enclosed within a protection case. When an eject-command button (not shown) is pressed, the disc tray 200 moves out of the disc drive to allow a user to place a disc on or remove a disc from the disc tray 200. In contrast, when a closing button (not shown) is pressed, the disc tray 200 moves back to the disc drive, and a disc detection and reproduction can be performed.

The disc loading mechanism 210 includes a motor to open or close the disc tray 200. Algorithms for driving the motor are generally known to one skilled in the art, and a detailed explanation thereof will be omitted herein.

The shown embodiment of the disc detection and reproduction unit 220 comprises an eject-end switch (EJEND) 222, a load-end switch (LDEND) 224, a counter 226, and a controller 228. The eject-end switch 222 is turned on when the disc tray 200 is completely open. The load-end switch 224 is turned on when the disc tray 200 is completely closed. The turn-on signals of the eject-end switch 222 and the load-end switch 224 are input to the controller 228 to determine the state of the disc tray. The counter 226 counts the elapsed time between when the disc tray 200 is in an open state and when the disc tray closes completely. When the disc tray 200 is fully closed, the load-end switch 224 is turned on. The controller 228 drives the motor (not shown) to open/close the disc tray 200, and instructs the counter 226 to start a counting operation, when the disc tray 200 starts closing, or when the closing button of the disc drive is pressed. The controller 228 also receives the turn-on signals from the eject-end switch 222 and the load-end switch 224, and instructs the counter 226 to stop the counting when the load-end switch 224 is turned on. Thereafter, the controller 228 compares a count value from the counter 226 with a predetermined reference value. The predetermined reference value may be obtained by counting the elapsed time between when the disc tray 200 is in an open state, holding a general-type disc that is much lighter than the cartridge-type disc and when the disc tray closes completely. The predetermined reference value may have a predetermined error of ±α. The predetermined reference value may be stored in a memory device (not shown). As such, when the count value for a disc placed in the disc tray 200 is greater than the predetermined reference value, the disc is determined to be a cartridge-type disc. While described in terms of switches, it is understood that other detection mechanisms may be used to detect the movement of the disc tray 200, such as optical mechanisms. Further, it is understood that the elapsed time could be measured between other predetermined positions beyond start and stop positions.

Figure 3:
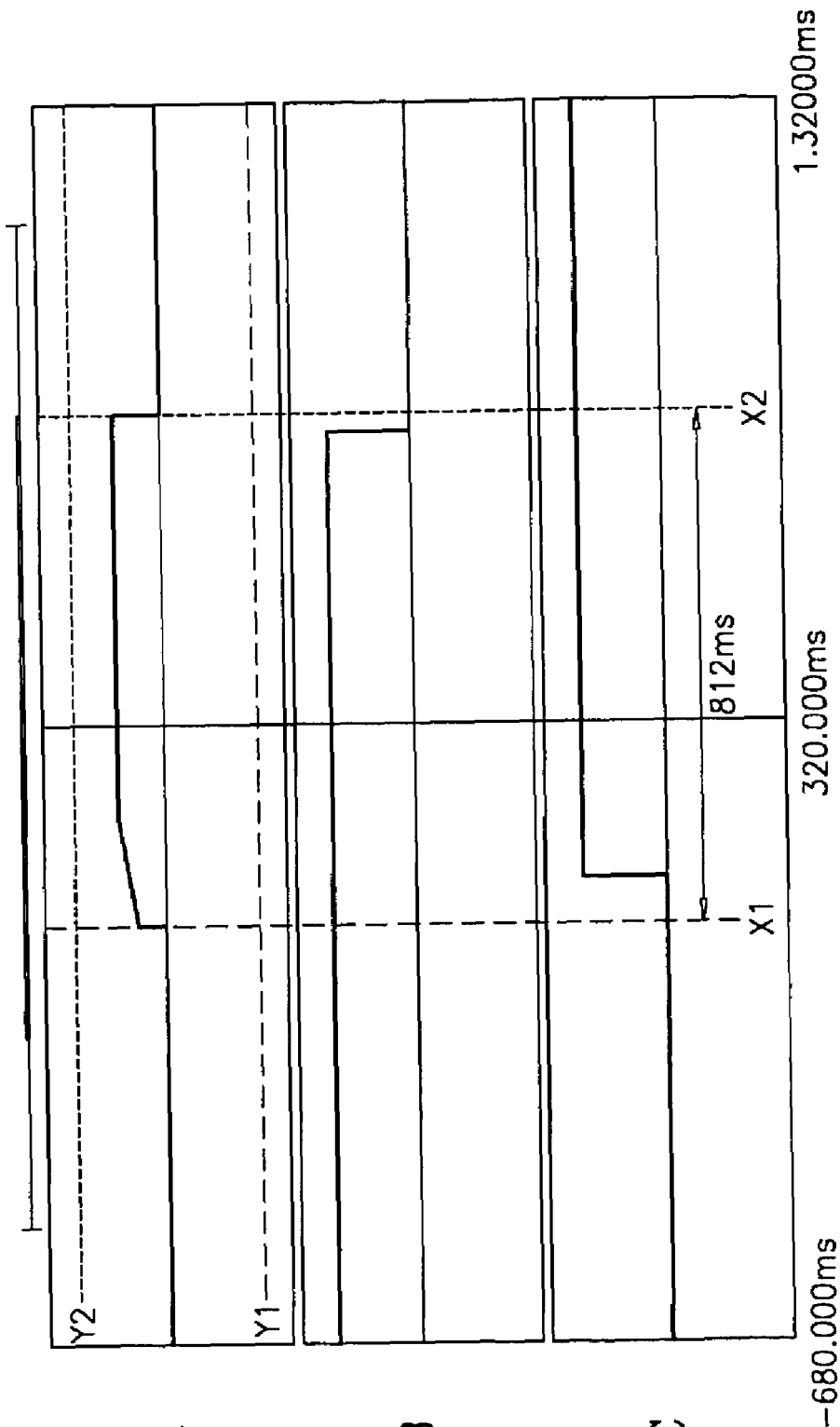
FIGS. 3A through 3C illustrate associated signals measured when a normal disc is inserted in the disc drive

FIGS. 3A through 3C and FIGS. 4A through 4C illustrate examples of associated signals measured when a general-type disc and a cartridge-type disc are loaded in the disc drive, respectively. FIG. 3A is a waveform of a signal for driving a motor to close a disc tray 220 holding a general-type disc by pressing a closing button on the disc drive. The motor starts working at time X1 and stops working at time X2. FIG. 3B is a waveform of a signal corresponding to the load-end switch 224. The signal is '0' when the disc tray 200 is completely closed and '1' otherwise. FIG. 3C is a waveform of a signal corresponding to the eject-end switch 222. The signal is '0' when the disc tray 200 is completely open and '1' otherwise. In FIG. 3C, when the signal becomes '1', the disc tray 200 starts closing. As shown in FIGS. 3A through 3C, it takes about 812 milliseconds for the disc tray 200 to close completely from an open state.

Figure 4:
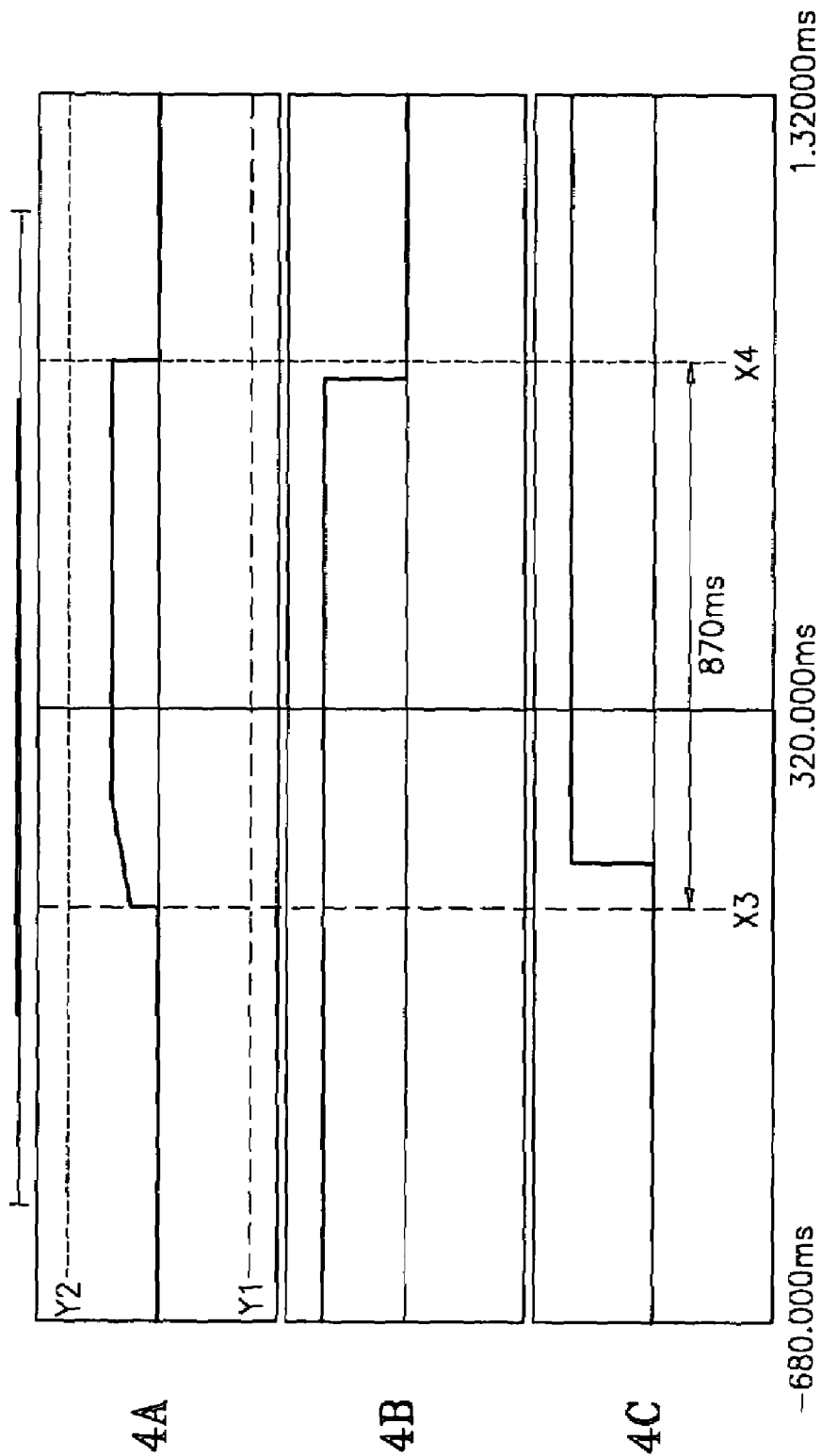
FIGS. 4A through 4C illustrate associated signals measure when a cartridge-type disc is inserted in the disc drive.

FIG. 4A is a waveform of a signal for driving the motor to close the disc tray 200 holding a cartridge-type disc by pressing a closing button in the disc drive. The motor starts working at time X3 and stops working at time X4. FIG. 4B is a waveform of a signal corresponding to the load-end switch 224. The signal is '0' when the disc tray 200 is completely closed and '1' otherwise. FIG. 4C is a waveform of a signal corresponding to the eject-end switch 222. The signal is '0' when the disc tray 200 is completely open and '1' otherwise. In FIG. 4C, when the signal becomes '1', the disc tray 200 starts closing. As shown in FIGS. 4A through 4C, it takes about 870 milliseconds for the disc tray 200 to close completely from an open state.

The closing time difference of more than 50 milliseconds between the general-type disc (i.e., a disc without a case) and the cartridge-type disc is caused by a difference between their weights. The general-type disc weighs about 15.5~16.5 gram, while the cartridge-type disc generally weighs 4 times more than the conventional disc. The present invention uses this closing time difference to detect whether the disc in the disc tray 200 is a cartridge-type disc or a general-type disc.

Figure 5:
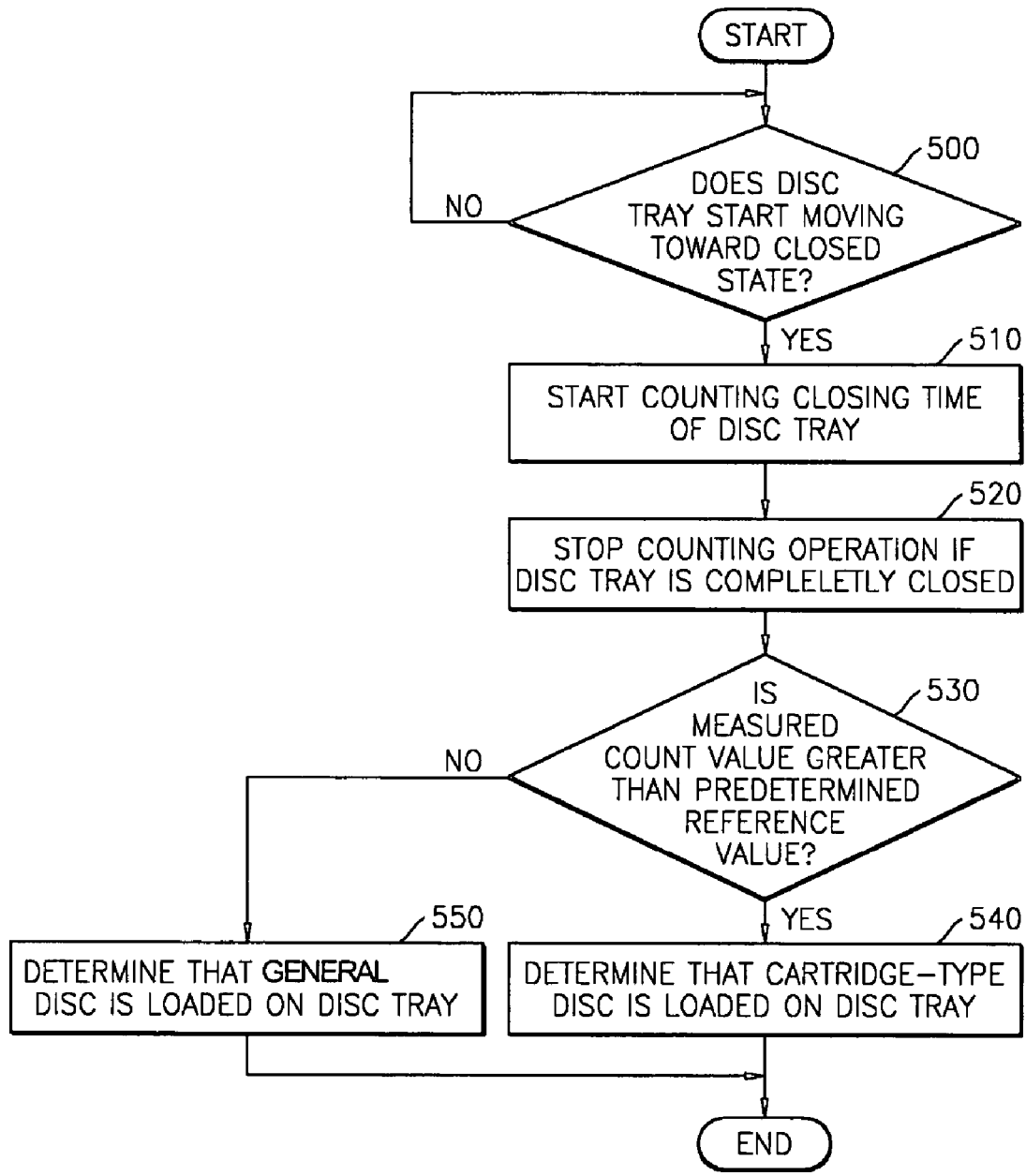
FIG. 5 is a flowchart of a method for detecting a cartridge-type disc according to an aspect of the present invention.

FIG. 5 is a flowchart of a method for detecting the type of a disc according to an aspect of the present invention. The method may be implemented in the controller 228 of FIG. 2. The controller 228 may be a processor which implements the method of FIG. 5 using software encoded on a computer readable medium. It is determined whether a command to close the disc tray has been input, i.e., whether the disc tray starts closing (operation 500). When the disc tray 200 starts closing, the counter 226 starts operating (operation 510). When the load-end switch 224 is turned on, which means that the signal in FIG. 4B becomes '0', and the disc tray has closed completely, the counter 226 stops operating (operation 520). A resulting count value from the counter 226 is compared with a predetermined reference value (operation 530). The predetermined reference value is obtained by counting an elapsed time between when the disc tray 200 is holding a general-type disc in an open state and when it closes completely and adding a predetermined error of ±α to the elapsed time. If the resulting count value is greater than the predetermined reference value, it is determined in operation 540 that a cartridge-type disc is loaded in the disc drive. If the resulting count value is less than the predetermined reference value, it is determined in operation 550 that a general-type disc (i.e., a disc without a cartridge) is loaded in the disc drive.

Figure 1B:
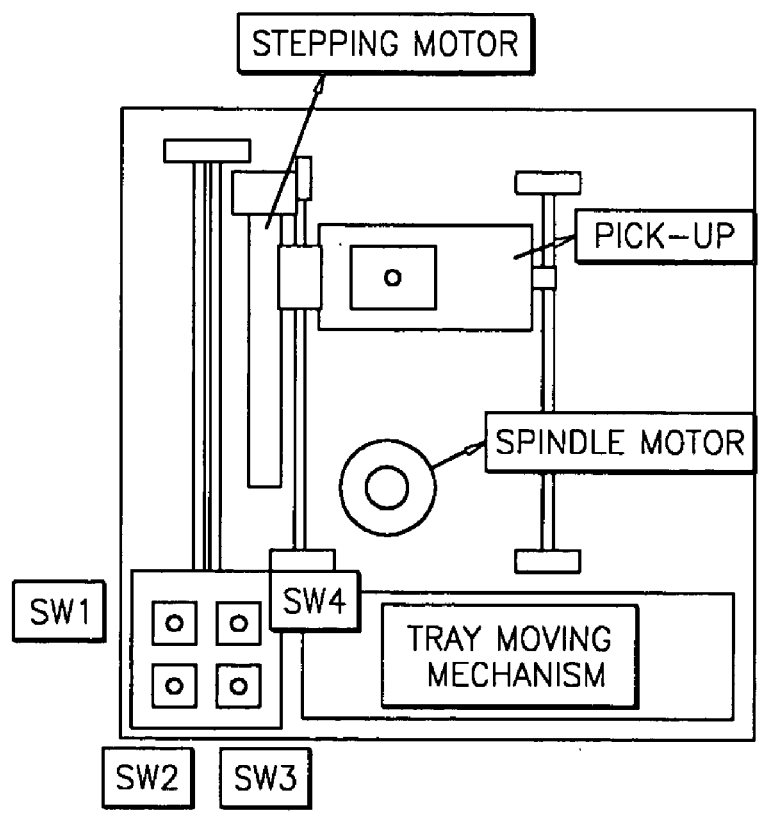
FIG. 1B is a partial structure of a conventional disc drive.

The method described so far corresponds to detecting the type of the disc loaded in the disc drive. If a cartridge-type disc has been detected, a process for detecting the remaining sensor holes on the cartridge-type disc as shown in FIG. 1 may be further performed.

As described above, the present invention uses a closing time of a disc tray without any operation of a mechanical switch to detect a type of the disc loaded in a disc drive. Accordingly, the detection operation is performed without wearing out a mechanical switch. Accordingly, the present invention provides a reliable detection operation independent of a type of a mechanical switch.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for detecting a type of a disc loaded in a disc drive, the method comprising:
    measuring an elapsed time between when a disc tray is in an open state and when the disc tray closes completely;
    comparing the elapsed time with a predetermined reference value to provide a comparison result; and
    identifying and distinguishing between the disc as one of a cartridge-type disc and a general-type disc not being in a cartridge based on the comparison result.

2. The method of claim 1, wherein the predetermined reference value is obtained by counting a time between when the disc tray is holding the general-type disc in the open state and when the disc tray closes completely and adding a predetermined error range to the time.

3. An apparatus of detecting a type of a disc loaded in a disc drive, the apparatus comprising:
    a closing mechanism which is pressed by a user to output a signal indicating that a disc tray to be closed;
    a load-end switch to be turned on when the disc tray is completely closed;
    a counter to count an elapsed time between when the closing mechanism is pressed by the user and when the load-end switch is turned on; and
    a controller which instructs the disc tray to close when receiving the signal from the closing mechanism and instructs the counter to start counting when the signal is received, instructs the counter to stop counting when the load-end switch is turned on, obtains a resulting count value, and determines that the disc is a cartridge-type disc when the resulting count value is greater than a predetermined reference value.

4. The apparatus of claim 3, wherein the predetermined reference value is obtained by counting a time between when the disc tray holding the general-type disc in an open state and when the disc tray closes completely and adding a predetermined error range to the time.

5. A method of detecting a type of a disc loaded in a disc drive, the method comprising:
    recording a start time when a disc tray supporting the disc starts closing from an open state;
    recording a stop time when the disc tray is completely closed;
    comparing a resulting count value with a predetermined reference value;
    determining that the disc is a cartridge-type disc when the resulting count value is greater than the predetermined reference value;
    detecting whether sensor holes formed on the cartridge-type disc are open or closed; and
    recognizing a state of the disc based on the result of detecting the sensor holes.

6. The method of claim 5, wherein the predetermined reference value is obtained by counting a time between when the disc tray is holding a general-type disc in the open state and when the disc tray closes completely and adding a predetermined error range to the time.

7. An apparatus for detecting a type of a disc loaded in a disc drive, the apparatus comprising:
    a disc tray shaped to receive a cartridge-type disc and a general-type disc which is not in a cartridge;
    a disc loading mechanism to move the disc tray between a first position and a second position during a loading operation; and
    a disc detection and reproduction unit which detects and identifies a received disc on the tray as being one of the general-type disc and the cartridge-type disc according to an elapsed time for the disc tray to move between the first position and the second position during the loading operation, and which reproduces the received disc.

8. The apparatus of claim 7, wherein the disc loading mechanism comprises a motor to open or close the disc tray.

9. The apparatus of claim 7, wherein the disc detection and reproduction unit comprises:
    an eject-end switch which is turned on when the disc tray is in the first position;
    a load-end switch which is turned on when the disc tray is in the second position; and
    a counter which counts the elapsed time between when the disc tray is in the first position and the eject-end switch is turned on and when the disc tray is in the second position and the load-end switch is turned on.

10. The apparatus of claim 9, wherein the eject-end switch is turned to a first state from a second state when the disc tray is in an open state and the load-end switch is turned to a first state from a second state when the disc tray is in a closed state, and the counter counts a time between when the eject-end switch is turned from the first state to the second state and when the load-end switch changes to the first state from the second state.

11. The apparatus of claim 9, wherein the counter counts an elapsed time between when the disc tray is an open state and when the disc tray closes completely.

12. The apparatus of claim 9, wherein the disc detection and reproduction unit drives a motor to open and close the disc tray, instructs the counter to start a counting operation when the disc tray begins to close, records a turn on signal from each of the eject-end switch and the load-end switch, instructs the counter to stop counting when the load-end switch is turned on, and compares a count value from the counter with a predetermined reference value.

13. The apparatus of claim 12, wherein the predetermined reference value is obtained by counting an elapsed time between when the disc tray is holding a general-type disc in an open state and when the disc tray closes completely.

14. The apparatus of claim 9, wherein the predetermined reference value has have a predetermined error range.

15. A computer readable medium encoded with processing instructions for implementing a method of detecting a type of disc loaded in a disc drive performed by a computer, the method comprising:
    measuring an elapsed time between when a disc tray is in a first position and when the disc tray is in a second position;
    comparing the elapsed time with a predetermined reference value to provide a comparison result; and
    identifying and distinguishing between a disc received in the disc tray as one of a cartridge-type disc and a general-type disc not being in a cartridge according to the comparison result.

16. The computer readable medium of claim 15, wherein the predetermined reference value is obtained by counting a time between when the disc tray is holding the general-type disc in the open state and when the disc tray closes completely and adding a predetermined error range to the time.

17. A computer readable medium encoded with processing instructions for implementing a method of detecting a type of disc in a disc drive performed by a computer, the method comprising:

recording a start time when a disc tray supporting the disc starts closing from a first position;

recording a stop time when the disc tray is in a second position;

comparing a resulting count value with a predetermined reference value, the resulting count value being based on the recorded start time and the recorded stop time;

determining that the disc is a cartridge-type disc when the resulting count value is greater than the predetermined reference value; and determining that the disc is a general-type disc when the resulting count value is less than or equal to the predetermined reference value, the general-type disc being a disc not included in a cartridge.

18. The computer readable medium of claim 17, wherein the predetermined reference value is obtained by counting a time between when the disc tray is holding a general-type disc in the open state and when the disc tray closes completely and adding a predetermined error range to the time.

* * * * *